US012794911B2

(12) United States Patent
Zaytsev et al.

(10) Patent No.: US 12,794,911 B2
(45) Date of Patent: Nov. 10, 2026

(54) METHODS AND SYSTEMS FOR MULTI-CLOUD BREACH DETECTION USING ENSEMBLE CLASSIFICATION AND DEEP ANOMALY DETECTION

(71) Applicant: CrowdStrike, Inc., Irvine, CA (US)

(72) Inventors: Vitaly Zaytsev, Beaverton, OR (US); Robert Molony, Oakland, CA (US); Joel Robert Spurlock, Portland, OR (US); Brett Meyer, Alpharetta, GA (US)

(73) Assignee: CrowdStrike, Inc., Sunnyvale, CA (US)

( * ) Notice: Subject to any disclaimer, the term of this patent is extended or adjusted under 35 U.S.C. 154(b) by 525 days.

(21) Appl. No.: 17/977,898

(22) Filed: Oct. 31, 2022

(65) Prior Publication Data

US 2024/0146747 A1 May 2, 2024

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ........................ H04L 63/1425; H04L 63/1416
See application file for complete search history.

(56) References Cited

U.S. PATENT DOCUMENTS

| | | | | |
|---|---|---|---|---|
| 2014/0033307 | A1* | 1/2014 | Schmidtler | H04L 63/1483 726/22 |
| 2018/0357559 | A1* | 12/2018 | Truong | G06N 20/00 |
| 2021/0112091 | A1* | 4/2021 | Compton | H04L 63/1416 |
| 2021/0160247 | A1* | 5/2021 | Gaddam | H04L 63/102 |

* cited by examiner

*Primary Examiner* — Jason K Gee
*Assistant Examiner* — Brian William Avery
(74) *Attorney, Agent, or Firm* — Lee & Hayes, P.C.

(57) ABSTRACT

Methods and systems for multi-cloud breach detection using ensemble classification and deep anomaly detection are disclosed. According to an implementation, a security appliance may receive logged event data. The security appliance may determine using a supervised machine learning (ML) model, a first anomaly score representing a first context. The security appliance may further determine using a semi-supervised machine learning (ML) model, a second anomaly score representing the second context, and using an unsupervised ML model, one or more third anomaly scores representing one or more third contexts. The security appliance may aggregate the first anomaly score, the second anomaly score and the one or more third anomaly scores using a classification module to produce a final anomaly score and a final context. The security appliance may determine that an anomaly exists and a type of attack based on the final anomaly score and the final context.

18 Claims, 5 Drawing Sheets

METHODS AND SYSTEMS FOR MULTI-CLOUD BREACH DETECTION USING ENSEMBLE CLASSIFICATION AND DEEP ANOMALY DETECTION

BACKGROUND

Traditional security approaches fail to protect organizations against state-of-the-art attacks in the cloud, where an adversarial actor gains access to a cloud customer's resources or steals valuable data. Malware utilizes techniques to extract user credentials stored in the memory of the compromised system. Stolen credentials (e.g., user, service or admin account) could then be used to access the company's cloud infrastructure. Detecting these attacks ultimately requires the system to be able to identify malicious user behaviors based on cloud logs and APIs used by the user.

Targeted attack, as another type of cyber-attack, may use malware or other techniques that do not require running malware on the target systems. For example, a benign program with administrative privileges may be compromised using a remote zero-day attack to provide an adversary with unauthorized administrative access to the company's cloud infrastructure, even without the use of malware. Additionally or alternatively, an adversary may steal the credentials of a legitimate user, access the system as that user, and then elevate privilege level (e.g., using those credentials, or by exploiting a vulnerability). This may permit the adversary to use normal administrative tools, but without authorization. Given the wide variety of attack types, it is challenging to determine whether an activity taking place on a computer is malicious.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
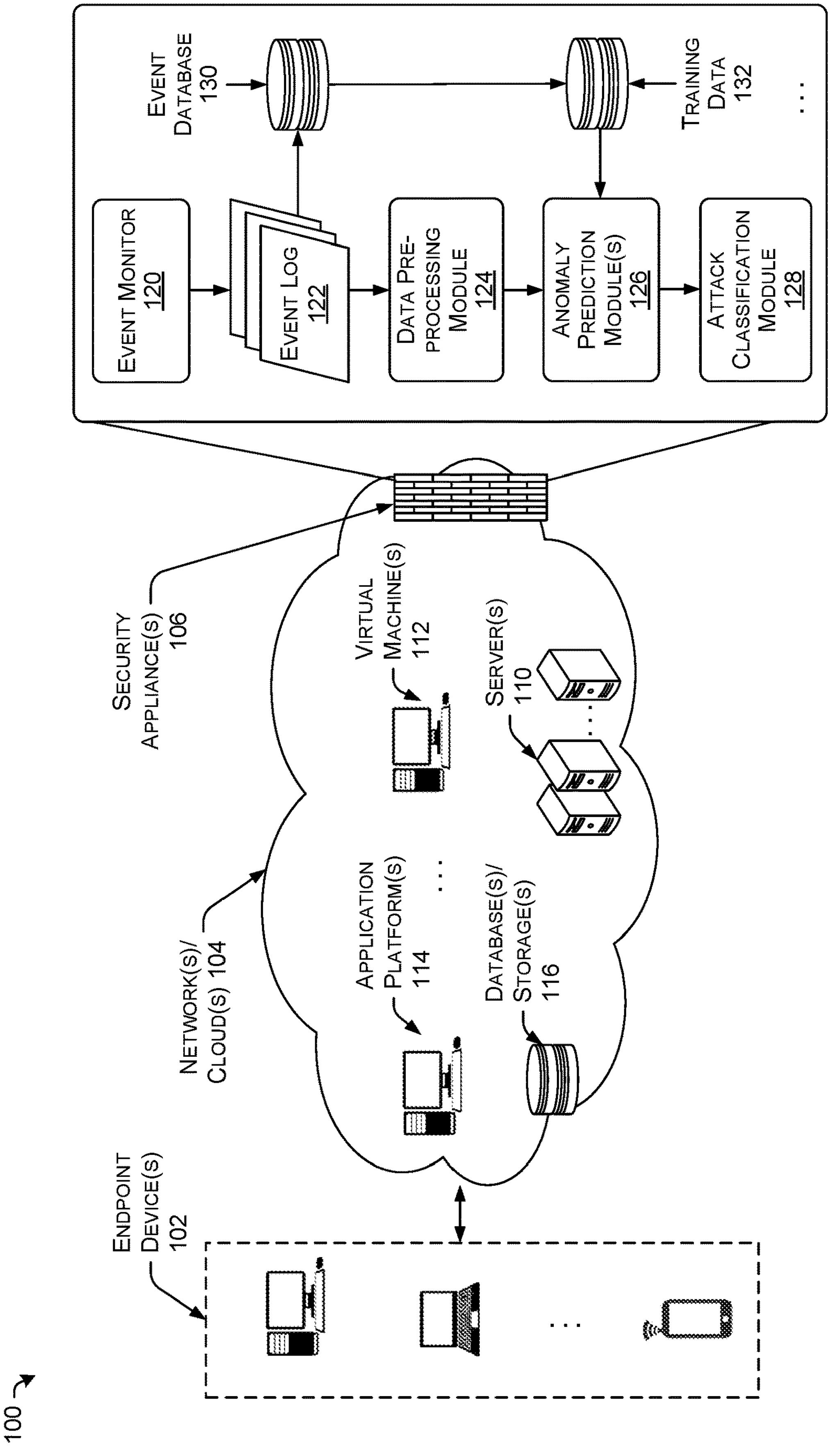
FIG. 1 illustrates an example network scenario, in which methods for multi-cloud breach detection using ensemble classification and deep anomaly detection are implemented.

Techniques for multi-cloud breach detection using ensemble classification and deep anomaly detection are disclosed are discussed herein. In an example, a method for multi-cloud breach detection may be implemented on a security appliance in a network/cloud. The method for multi-cloud breach detection may comprise an operation of receiving event data indicative of a user behavior on a cloud, an operation of determining, based at least in part on the event data and by a supervised machine learning (ML) model, a first anomaly prediction score representing a first context, an operation of determining using a semi-supervised machine learning (ML) model, a second anomaly prediction score representing a second context, an operation of determining using a unsupervised machine learning (ML) model, a plurality of third anomaly prediction scores representing a plurality of third contexts, and an operation of determining using a classification module, a final anomaly prediction score representing a potential new context, based at least in part on the first anomaly prediction score, the first context, the second prediction anomaly score, the second context, the one or more third anomaly prediction scores, or the one or more third contexts. When the final anomaly prediction score is equal to or greater than a threshold, the security appliance may determine that the user behavior includes an anomaly. The security appliance may further determine that the anomaly is a new attack (i.e., zero-day-attack) based at least in part on the potential new context.

The method for multi-cloud breach detection may be implemented on a security appliance connected to the network/cloud. The security appliance may include one or more anomaly detection module(s) corresponding to the one or more of the supervised ML model, the semi-supervised ML model, and the unsupervised ML model. The security appliance may be a hardware-based device implemented on one or more computing devices in the network/cloud including but are not limited to the endpoint devices, the server devices, the databases/storages, etc. In some examples, the security appliance may be a software-based security appliance installed on the endpoint devices to detect the attack originated from the endpoint device and produce telemetry data. In yet other examples, the security appliance may be a cloud-based service provided through the managed security service providers (MSSPs). The cloud-based service may be delivered to various network participants on demand to monitor the activities on the network and/or the cloud environment. The security appliance may monitor the network traffic flow to inspect any suspicious behaviors originated from the endpoint devices, the server devices, or other network entities, etc.

In some examples, a computing device may pre-train the various ML models for anomaly detection. The computing device may prepare a set of training data based on historical events stored in a database. The computing device may determine, based at least in part on known anomaly behaviors in various contexts or domains, a plurality of first features corresponding to the known anomaly behaviors. The computing device may further label, based at least in part on the plurality of first features, the set of training data to obtain labeled training data and train a first ML model using the labeled training data to obtain the supervised anomaly detection module. In some examples, the computing device may augment a small set of labeled data using self-labeling algorithm (e.g., label propagation algorithm) and train a second ML model using the augmented labeled dataset obtain the semi-supervised anomaly detection module. In some examples, the computing device may train a third ML model using unlabeled dataset without ground truth knowledge to obtain an unsupervised ML anomaly detection module.

In various examples, the computing device may apply a time series rolling aggregation method for malicious behavior detection using expanding time windows based on cumulative sum of all detected events for each feature.

In various examples, the classification module may use any type of ensemble models to determine the final anomaly prediction score including but are not limited to, bagging, boosting, adaptive boosting, gradient boosting, extreme gradient boosting, stacking, voting and averaging, majority voting, weighted average voting, etc.

In some examples, the unsupervised anomaly detection model may include a plurality of classifiers to learn feature representations. Any unsupervised anomaly detection may be used including but are not limited to, local outlier factor, isolation forest, deep auto-encoding and clustering, etc. An anomaly is triggered based on an unsupervised anomaly detection model for each discrete domain identified in the workflow, each of which encoding critically important security knowledge.

Without the knowledge from multiple domains, covering all possible contexts where the security breach could happen, any single pure anomaly classifier based on unsupervised learning can suffer from a high false positive rate, rendering it impractical for field deployment. Combining expert knowledge on past attacks (i.e., labeled data) and anomaly prediction scores from multiple discrete domain classifiers, provides an advantage over the traditional solutions. Not only it improves the prediction accuracy, but also anomaly explanation can be derived from specific detection methods. The present disclosure combines different machine learning models for multi-cloud breach detection, particularly, utilizing unsupervised deep learning and ensemble classification to improve the prediction accuracy. The traditional techniques usually reply on a single anomaly model, causing miss detection or high false positive rate. By combining the ground truth based ML model, partial ground truth based ML model, and no ground truth based deep ML model, the present disclosure can efficiently discover the patterns and context hidden in high-dimensional event data and detect some never seen attacks, i.e., zero-day attacks, in a cloud environment. In addition, the present disclosure uses ensemble classification to aggregate the predictions from different ML models, thus, further improving the prediction accuracy.

In some implementations, the techniques discussed herein may be implemented on any network participants that can communicate to the network. Example implementations are provided below with reference to the following figures.

FIG. 1 illustrates an example network scenario, in which methods for multi-cloud breach detection using ensemble classification and deep anomaly detection are implemented.

As illustrated in FIG. 1, the network scenario 100, in which methods and systems for multi-cloud breach detection is implemented may include one or more endpoint device(s) 102 that can access, through a network, a variety of resources located in network(s)/cloud(s) 104. The network scenario 100 may further include one or more security appliance(s) 106 configured to provide an intrusion detection or prevention system (IDS/IPS), denial-of-service (DoS) attack protection, session monitoring, and other security services to the devices in the networks/cloud(s) 104.

In various examples, the endpoint device(s) 102 may be any device that can connect to the networks/cloud(s) 104, either wirelessly or in direct cable connection. For example, the endpoint device(s) 102 may include but are not limited to a personal digital assistant (PDA), a media player, a tablet computer, a gaming device, a smart watch, a hotspot, a personal computer (PC) such as a laptop, desktop, or workstation, or any other type of computing or communication device. In some examples, the endpoint device(s) 102 may include the computing devices implemented on the vehicle including but are not limited to, an autonomous vehicle, a self-driving vehicle, or a traditional vehicle capable of connecting to internet. In yet other examples, the endpoint device(s) 102 may be a wearable device, wearable materials, virtual reality (VR) devices, such as a smart watch, smart glasses, clothes made of smart fabric, etc.

In various examples, the network(s)/cloud(s) 104 can be a public cloud, a private cloud, or a hybrid cloud and may host a variety of resources such as one or more server(s) 110, one or more virtual machine(s) 112, one or more application platform(s) 114, one or more database(s)/storage(s) 116, etc. The server(s) 110 may include the pooled and centralized server resources related to application content, storage, and/or processing power. The application platform(s) 114 may include one or more cloud environments for designing, building, deploying and managing custom business applications. The virtual desktop(s) 112 may image the operating systems and application of the physical device, e.g., the endpoint device(s) 102, and allow the users to access their desktops and applications from anywhere on any kind of endpoint devices. The database(s)/storage(s) 116 may include one or more of file storage, block storage or object storage.

It should be understood that the one or more server(s) 110, one or more virtual machine(s) 112, one or more application platform(s) 114, and one or more database(s)/storage(s) 116 illustrate multiple functions, available services, and available resources provided by the network(s)/cloud(s) 104. Although shown as individual network participants in FIG. 1, the server(s) 110, the virtual machine(s) 112, the application platform(s) 114, and the database(s)/storage(s) 116 can be integrated and deployed on one or more computing devices and/or servers in the network(s)/cloud(s) 104.

In implementations, the security appliance(s) 106 can be any types of firewalls. An example of the firewalls may be a packet filtering firewall that operates inline at junction points of the network devices such as routers and switches. The packet filtering firewall can compare each packet received to a set of established criteria, such as the allowed IP addresses, packet type, port number and other aspects of the packet protocol headers. Packets that are flagged as suspicious are dropped and not forwarded. Another example of the firewalls may be a circuit-level gateway that monitors TCP handshakes and other network protocol session initiation messages across the network to determine whether the session being initiated is legitimate. Yet another example of the firewalls may be an application-level gateway (also referred to as a proxy firewall) that filters packets not only according to the service as specified by the destination port but also according to other characteristics, such as the HTTP request string. Yet another example of the firewalls may be a stateful inspection firewall that monitors the entire session for the state of the connection, while also checks IP addresses and payloads for more thorough security. A next-generation firewall, as another example of the firewall, can combine packet inspection with stateful inspection and can also include some variety of deep packet inspection (DPI), as well as other network security systems, such as IDS/IPS, malware filtering and antivirus.

In various examples, the security appliance(s) 106 (i.e., the one or more firewalls) can be normally deployed as a hardware-based appliance, a software-based appliance, or a cloud-based service. The hardware-based appliance may also be referred to as network-based appliance or network-based firewall. The hardware-based appliance, for example, the security appliance(s) 106, can act as a secure gateway between the networks/cloud(s) 104 and the endpoint device(s) 102 and protect the devices/storages inside the perimeter of the networks/cloud(s) 104 from getting attacked by the malicious actors. Additionally or alternatively, the hardware-based appliance can be implemented on a cloud device to intercept the attacks to the cloud assets. In some other examples, the security appliance(s) 106 can be a cloud-based service, in which, the security service is provided through managed security service providers (MSSPs). The cloud-based service can be delivered to various network participants on demand and configured to track both internal network activity and third-party on-demand environment. In some examples, the security appliance(s) 106 can be software-based appliance implemented on the individual endpoint device(s) 102. The software-based appliance may also be referred to as host-based appliance or host-based firewall. The software-based appliance may include the security agent, the anti-virus software, the firewall software, etc., that are installed on the endpoint device(s) 102.

In FIG. 1, the security appliance(s) 106 is shown as an individual device and/or an individual cloud participant. However, it should be understood that the network scenario 100 may include multiple security appliance(s) respectively implemented on the endpoint device(s) 102, or the network(s)/cloud(s) 104. As discussed herein, the security appliance(s) 106 can be a hardware-based firewall, a software-based firewall, a cloud-based firewall, or any combination thereof. The security appliance(s) 106 can be deployed on a server (i.e., a router or a switch) or individual endpoint device(s) 102. The security appliance(s) 106 can also be deployed as a cloud firewall service delivered by the MSSPs.

In some examples, the security appliance(s) 106 may include an event monitor 120, an event log 122, a data pre-processing module 124, one or more anomaly detection module(s) 126, an attack classification module 128, etc.

The event monitor 120 may constantly monitor real-time user activities associated with one or more resources located in network(s)/cloud(s) 104. By way of example and without limitation, the real-time user activities may include attempting to log in to a secured website through the endpoint device(s) 102 and/or the application platform(s) 114, clicking a phishing link on a website or in an email from the endpoint device(s) 102 and/or the virtual machine(s) 112, attempting to access files stored in the database(s)/storage(s) 116, attempting to log in to the server(s) 110 as an administrator account, attempting to configure and/or re-configure the settings of various assets on the network(s)/cloud(s) 104, etc. The information associated with the real-time user activities may be cached to the event log 122, as event log data. In general, the event log data includes a timestamp for each logged event, a user account associated with the event, an IP address of a computing device that generates the event, an HTTP address of a link being clicked by the user, a command line entered by the user, etc. The context behind the event log data may be used to interpret the potential purpose of the user behavior and to determine whether a user behavior is a malicious or not. The event log data may be further stored in an event database 130, located locally or remotely.

In implementations, the event log data may be pre-processed before it is provided to the anomaly detection module(s) 126 as the quality of data also affects the usefulness of the information derived from the data. The data pre-processing module 124 may perform one or more operations on the event log data such as, data cleaning, data transformation, dimension reduction, etc. In some examples, the real-time event log data may be directly provided to the anomaly detection module(s) 126 without pre-processing.

The anomaly detection module(s) 126 may include one or more machine learning (ML) models, for example, a supervised ML model, a semi-supervised ML model, an unsupervised ML model, etc. Each of the ML models may be trained to produce a likelihood of an anomaly and the context associated with the anomaly. In some examples, the ML model may be trained to predict a plurality of potential anomaly with associated probability values. For instance, the ML model may predict that there is 40% chance of identity theft, 15% chance of privilege escalation, 8% chance of lateral movement, etc. The one or more ML models may be individually trained using labeled training data (i.e., data labeled based on ground truth knowledge), unlabeled training data (i.e., data without ground truth knowledge), or a combination thereof, etc. The training of the one or more ML models may be performed on computing devices and deployed on the security appliance(s) 106 once the performance of the one or more ML models satisfies a threshold.

In some examples, the training data 132 may be prepared based on the event data stored in the event database 130. As discussed herein, the event database 130 may store raw event data with enriched information associated with each event. The data preparation may include operations such as data cleaning, instance selection, normalization, one hot encoding, transformation, feature extraction and selection, etc.

The various outputs of the one or more ML models of the anomaly detection module(s) 126 may be provided to the attack classification module 128 to make a final decision on the anomaly. When multiple ML models are used, the outputs from the anomaly detection module(s) 126 may indicate potential anomalies across discrete domains, each with a prediction score. The attack classification module 128 may use any type of classification algorithms/models to aggregate the outputs and determine a final prediction score based at least in part on the various prediction scores outputted from the anomaly detection module(s) 126. The final prediction score may be further used to determine whether a user behavior includes an anomaly and what is the context behind the user behavior if it is a malicious attack. In some embodiments, based at least in part on the context, the attack classification module 128 may determine it is a new type of attack.

The present disclosure leverages the outputs from multiple ML models to discover anomalies across discrete domains (e.g., user identity, user behavior, privilege escalation entity access, geolocation anomalies, data exfiltration, authentication, etc.). The anomaly scores outputted by the multiple ML models may encode critically important security knowledge that can be used to pinpoint the source of a breach or an anomaly behavior and the context behind the breach or the anomaly behavior. Further, the present disclosure utilizes multiple ML models to cover a broad spectrum of aspects of the cloud native resources that the malicious attack may occur. Comparing to the existing techniques which usually depend on a single ML model trained based on known attacks in a single domain, the present disclosure may also resolve the problems of detecting zero-day attacks in a cloud environment and enables proactive detection of cybersecurity cloud breaches.

Figure 2:
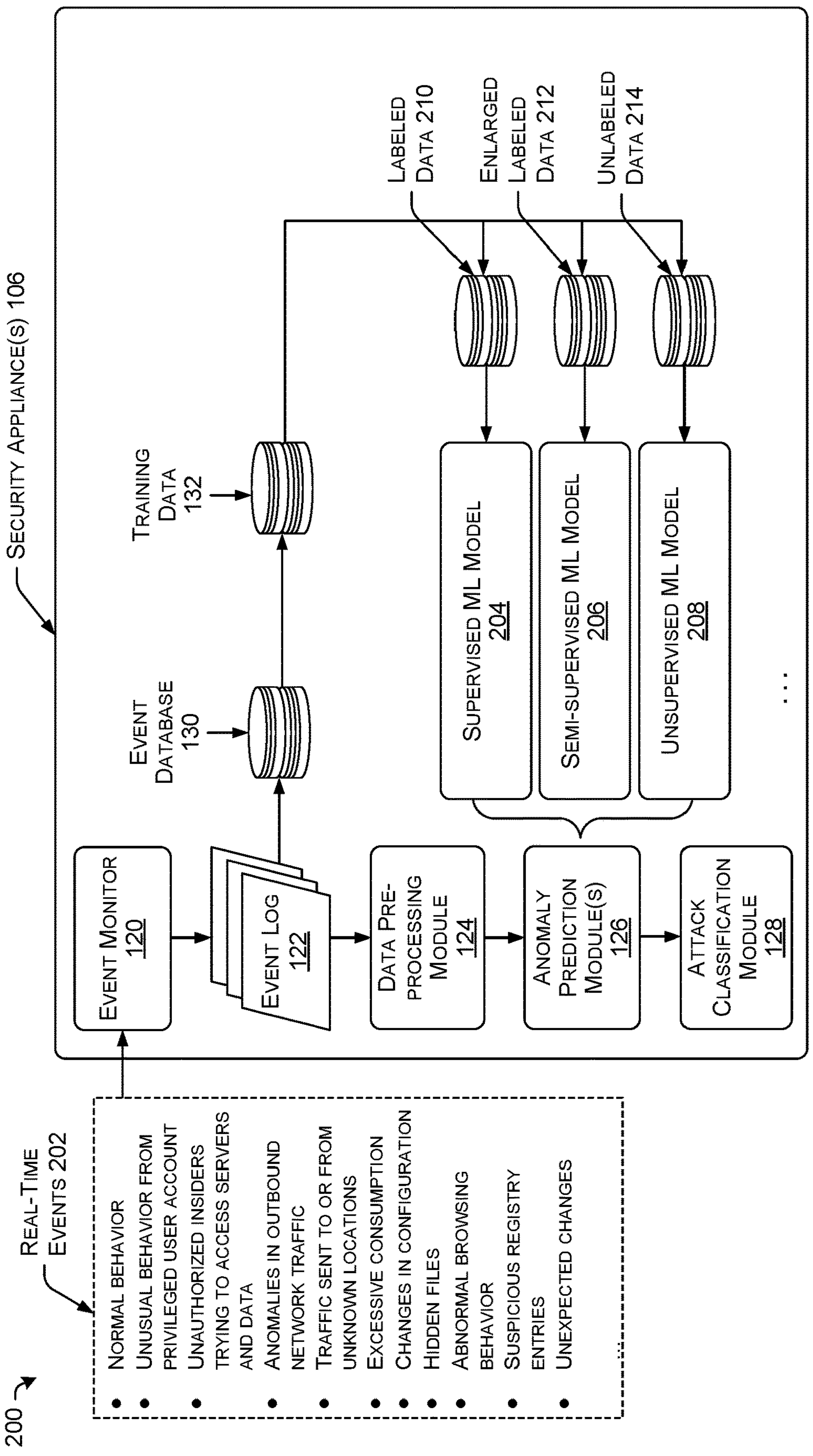
FIG. 2 illustrates an example diagram of a security appliance, in which methods for multi-cloud breach detection using ensemble classification and deep anomaly detection are implemented according to an embodiment of the present disclosure.

FIG. 2 illustrates an example diagram of a security appliance, in which methods for multi-cloud breach detection using ensemble classification and deep anomaly detection are implemented according to an embodiment of the present disclosure.

The example diagram 200 of a security appliance may include one or more function modules similar to the security appliance(s) 106 of FIG. 1, for example, the event monitor 120, the event log 122, the event database 130, the data pre-processing module 124, the attack classification module 128, etc. The functions of these modules are described above with respect to FIG. 1, and therefore, are not detailed herein.

In implementations, real-time events 202 may be monitored by the event monitor 120 of the security appliance(s) 106. By way of example and without limitation, the real-time events 202 may include normal behavior, unusual behavior from privileged user account, unauthorized insiders trying to access servers and data, anomalies in outbound network traffic, traffic sent to or from unknown locations, excessive consumption changes in configuration, hidden files, abnormal browsing behavior, suspicious registry entries, unexpected changes, etc. The real-time events 202 may be associated with one or more network/cloud participants such as, the endpoint device(s) 102, server(s) 110, virtual machine(s) 112, application platform(s) 114, database(s)/storage(s) 116, etc.

According to the example diagram 200, the anomaly detection module(s) 128 may comprise a supervised ML model 204, a semi-supervised ML model 206, an unsupervised ML model 208, etc. The supervised ML model 204, the semi-supervised ML model 206, and the unsupervised ML model 208 are trained based at least in part on the training data 132. The training data 132 may include labeled data 210 built for training the supervised ML model 204, enlarged labeled data 212 built for training the semi-supervised ML model 206, and unlabeled data 214 built for training the unsupervised ML model 208.

In various examples, a set of features may be pre-defined to describe the user behaviors and/or events across different domains including but not limited to users, cloud assets, services, and network locations, based on the user behaviors and/or events data collected from the cloud environment. In some examples, the set of features may be pre-defined based on the past known attacks and further expanded using one hot encoding to improve the prediction accuracy.

As discussed herein, the supervised ML model 204 may be a machine learning (ML) model trained based on known knowledge of the past attacks and anomaly events in one or more domains. In some examples, a plurality expert rules may be implemented as the supervision source of labels. The labeled event data based on the past attacks and anomalies may form the labeled data 210 used to train the supervised module 204. The expert rules based labeled data can provide knowledge of known breaches and malicious user behaviors and can be used as a driving factor to improve the detection efficacy of the supervised ML model 204. In some examples, the training data 132 may include a timestamp for each user behavior and/or cloud event. A time series rolling aggregation method may be implemented, using expanding windows based on cumulative sum of all events for each feature.

The semi-supervised ML model 206 is a machine learning (ML) model trained based on enlarged labeled data 212. The enlarged labeled data 212 may include a first set of labeled data and a second set of unlabeled data. A semi-supervised classifier may be implemented to learn the hidden information in the second set of unlabeled data and label the data item based on the learned information. In some examples, a semi-supervised generative model or graph-based model may be implemented as the label propagation algorithm. During the training of the semi-supervised module 206, some data items from the second set of unlabeled data may be automatically labeled based at least in part on the knowledge learnt by the semi-supervised classifier. Once the most confident predictions of the label propagation algorithm are added to the labeled data set, the semi-supervised classifier may be retrained on the new augmented labeled dataset.

Figure 3:
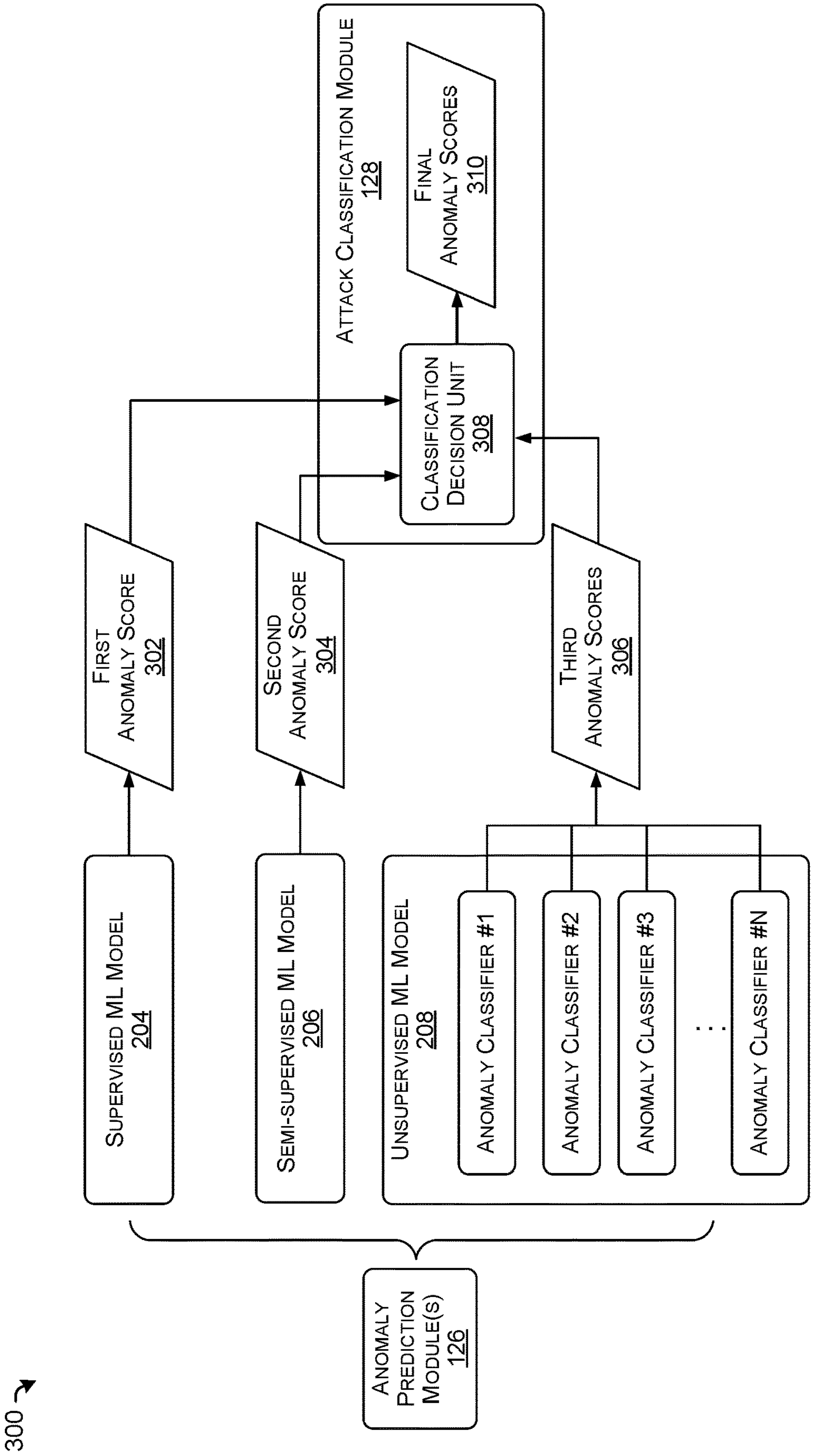
FIG. 3 illustrates an example diagram of anomaly detection module(s), in which methods for multi-cloud breach detection using ensemble classification and deep anomaly detection are implemented according to an embodiment of the present disclosure.

The unsupervised ML model 208 is a machine learning (ML) model trained based on unlabeled data 214. In some examples, multiple anomaly classifiers may be used to learn anomaly features across discrete domains, as illustrated in FIG. 3. The unsupervised module 208 may include anomaly classifier #1, anomaly classifier #2, anomaly classifier #3, . . . , and anomaly classifier #N. Each of the anomaly classifier may be trained to generate prediction result with respect to an anomaly feature. By way of example and without limitation, the anomaly features may be associated with user identity, user behavior, privilege escalation entity access, geolocation anomalies, data exfiltration, authentication, etc. In various examples, any unsupervised anomaly detection schemes may be implemented using local outlier factor, isolation forest, deep auto-encoding and clustering, etc.

In some examples, the unsupervised ML model 208 may implement a large spectrum of anomaly classifiers that cover all aspects of cloud native resources and entities.

An identity-based anomaly classifier, for example, may characterize user behavior based on cloud event type performed by the user and the services/target IPs that the user connects to. Users can be characterized by a set of cloud event types and the services/target IPs that the users connect to. In general, the users from a same group will have similar profiles of connections. The identity-based anomaly classifier may be trained based on normal observations associated with the users. Once a user behavior does not conform to expected normal user behavior, the identity-based anomaly classifier may mark the event or action taken by the user as anomalous.

In another example, a hierarchical embedding classifier may be implemented for privilege escalation detection. The hierarchical embedding classifier may be trained based on various levels of pre-authorized entities. When a user gains unauthorized privilege to access a system or a user grants admin privilege to an unauthorized user, the hierarchical embedding classifier may detect a misuse of privilege. One example of the privilege escalation may include an identity access management (IAM) policy misuse in the cloud environment, e.g., Amazon S3 bucket, Amazon web service (AWS) management console, etc.

In yet another example, a log-based anomaly classifier on may be implemented to identify brute force activity. The log-based anomaly classifier may be trained based on normal observations of user access and authentications. When anomalous attempts for a single user to fail authentication multiple times are observed, an alert may be triggered at the log-based anomaly classifier. In implementations, the log-based events may be associated with IAM access and authentications.

In yet another example, an IP address based anomaly classifiers may be implemented to identify login attempts to or from risky IP addresses. For example, login to or from an IP address could be never seen before within an organization, thus, triggering an alert at the IP address based anomaly classifiers.

In yet another example, a fast travel anomaly classifier may be implemented to detect impossibly fast travel between two different locations for a given username or an account ID. The fast travel anomaly classifier may be trained be trained based on observed geographic locations where the user normally logs in. The fast travel anomaly classifier may detect multi-county logins, flag anomalies based on the geolocations and logins from the same user from multiple countries per day.

In yet another example, a data exfiltration anomaly classifier may be implemented to identify the data exfiltration. In circumstances when a user identity is compromised, data stored may be removed, tampered, or stolen from some devices and/or storages in cloud environment. An alert from the log-based anomaly classifier and/or the identity-based anomaly classifier can assist identifying further damages caused by the detected anomaly event.

It should be understood that any unsupervised anomaly detection algorithms could be used for the plurality anomaly classifiers. Examples of the unsupervised anomaly detection algorithms include but are not limited to a generative adversarial network (GAN), autoencoders, and variational autoencoders, local outlier factor, isolation forest, deep auto-encoding and clustering, k-means clustering, k-nearest neighbors (KNN), hierarchical clustering, neural networks, principal component analysis (PCA), independent component analysis, singular value decomposition, etc.

In some examples, only normal observations are used to train the unsupervised ML model 208 to identify new attacks. However, the present disclosure is not intended to be limiting. The malicious attacks detected over a period of time may also be used to refine the performance of the unsupervised ML model 208.

As illustrated in FIG. 3, the supervised ML model 204 may generate a first anomaly score 302 in a first context. As the supervised ML model 204 is trained using labeled data and based on known attacks, the first anomaly scores 302 may indicate a probability that a known type of attack has occurred.

The semi-supervised ML model 206 may generate a second anomaly scores 304 in a second context. As the semi-supervised ML model 206 is trained using a combination of the data labeled based on known attacks and the data self-labeled based on machine learning, the semi-supervised ML model 206 can capture some never seen attack other than those known by the supervised ML model 204. The second anomaly scores 304 may indicate a probability of the never seen attack.

The unsupervised ML model 208 may generate one or more third anomaly scores 306 in one or more third contexts, based on the detection results from the plurality of anomaly classifiers. As discussed herein, the unsupervised ML model 208 may include a large number of anomaly classifiers, each trained based on at least the normal observations. The one or more third anomaly scores 306 may indicate that the anomalies described the corresponding one or more anomaly classifiers are triggered with certain probabilities.

In some examples, a real-time event (e.g., the real-time events 202 shown in FIG. 2) may trigger multiple alerts from the plurality of anomaly classifiers. The multiple alerts may have various prediction scores. A higher probability level (e.g., a higher third anomaly score 306) indicates a stronger association between the real-time event and an anomaly feature associated with a particular domain. For example, a real-time event may trigger alerts on an identity-based anomaly classifier and a data exfiltration anomaly classifier, however, the anomaly score predicted by the identity-based anomaly classifier may be higher than the anomaly score predicted by the data exfiltration anomaly classifier. In another example, a real-time event may trigger alerts on the log-based anomaly classifier and the fast travel anomaly classifier with equal predicted scores from both classifiers.

In some examples, the third anomaly scores 306 from the plurality of anomaly classifiers may be further considered as newly detected anomaly features for making a final decision. In implementations, the final decision on the anomaly may be made by the attack classification module 128. In addition to the third anomaly scores 306 from the unsupervised ML model 208, the attack classification module 128 may also consider the outputs from one or more of the supervised ML model 204 (i.e., the first anomaly score 302) and the output from the semi-supervised ML model 206 (i.e., the second anomaly score 304). In some examples, a classification decision unit 308 of the attack classification module 128 may use classification modules to aggregate the predictions from different anomaly prediction modules (i.e., the first anomaly score 302, the second anomaly score 304, and the third anomaly scores 306) to produce a final prediction of the anomaly. The classification decision unit 308 may use any types of classification models including but are not limited to, bagging, boosting, adaptive boosting, gradient boosting, extreme gradient boosting, stacking, voting and averaging, majority voting, weighted average voting, etc. The attack classification module 128 outputs a final anomaly score 310 that indicates a final prediction of an anomaly from the real-time event.

In general, new attacks (i.e., zero-day attacks) beyond the known labeled examples, raise alerts with high probability risk score and may cause high false positive alarm rate. By combining different models, i.e., expert rules based supervised module, self-labeling semi-supervised module, and deep learning unsupervised module, the present disclosure may significantly improve the prediction accuracy and reduce the false positive rate (FPR).

Although it is shown in FIG. 3 that the classification decision unit 308 of the attack classification module 128 combines the outputs from the supervised ML model 204, the semi-supervised ML model 206, and the unsupervised ML model 208, the present disclosure is not intended to be limiting. In some examples, while the expert rules are absent and only the deep learning unsupervised module is present, the classification decision unit 308 of the attack classification module 128 may implement nearest neighbor (NN) ensemble module to produce a final prediction of the anomaly. In some examples, the variational autoencoders may be implemented to learn expressive feature representations of normality using auto-encoders to determine anomalous behavioral event across multiple discrete domains.

The traditional solutions are usually based on a single anomaly (or monolithic) model. However, high-dimensional data creates challenges for single anomaly model. For example, most of the existing anomaly detection algorithms fail to produce accurate results from a large number of features and perform poorly on a data set of small size with a large number of features. Real anomalies may become hidden and unnoticed in a high-dimensional space. Thus, the traditional approaches may miss an attack as they only rely on a single domain or single context for anomaly detection, which, by itself, may not offer accurate insights at the required level of details. The present disclosure can provide separate prediction scores from different component models, each representing a discrete domain. Having the anomaly scores identified across discrete domains from each of the component models, the present disclosure allows the organizations to pinpoint the source of a breach or an anomaly behavior and the context behind it.

Figure 4:
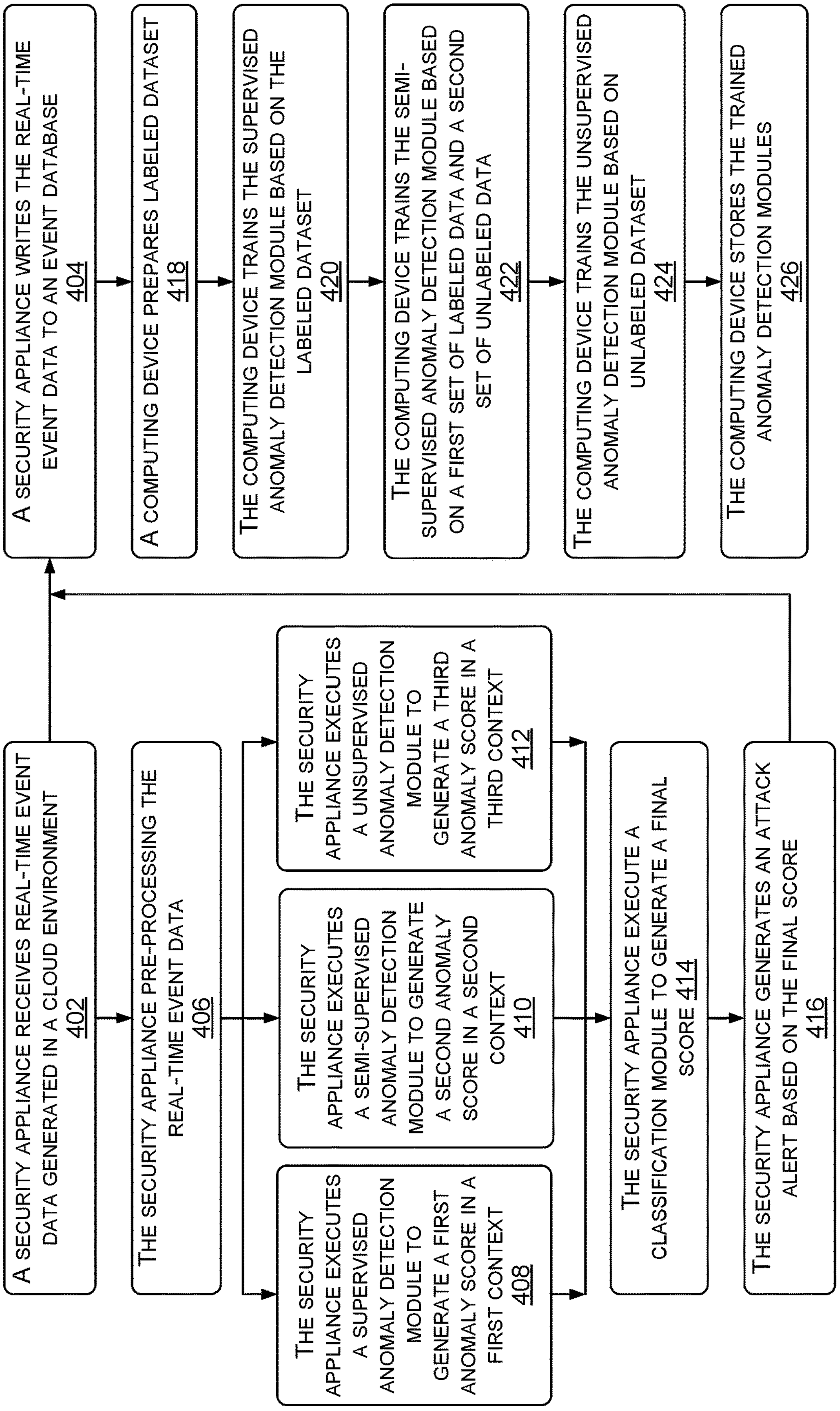
FIG. 4 illustrates an example process for multi-cloud breach detection using ensemble classification and deep anomaly detection according to an embodiment of the present disclosure.

FIG. 4 illustrates an example process for multi-cloud breach detection using ensemble classification and deep anomaly detection according to an embodiment of the present disclosure. By way of example and without limitation, the processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

At operation 402, a security appliance may receive real-time event data generated in a cloud environment. The security appliance may be the security appliance 106 (shown in FIG. 1) implemented on a server device located in the cloud environment. The security appliance can be a hardware-based appliance implemented by the server device, a cloud-based service that can be distributed to the cloud participants, or a software-based appliance implemented on the endpoint devices (also referred to as a security agent). The real-time event data includes normal user/network activities and unusual user behavior/network activities. In some examples, the real-time event data may be collected by the security agents installed on various computing devices, e.g., endpoint device(s), server device(s), storage device(s), etc.

At operation 404, the security appliance may write the real-time event data to an event database. The real-time event data can be saved as the source of training dataset used to train various anomaly detection modules. The real-time event data may be cached in a local event database of the security appliance or sent to a remote event database located in the cloud environment.

At operation 406, the security appliance may pre-process the real-time event data. As discussed herein, the real-time event data collected by various security agents may be raw data that has missing values, noise data, and other inconsistencies. Feeding the raw data to the anomaly detection modules may affect the performance of the anomaly detection. The security appliance may pre-process the real-time event data to transform the raw data obtained from security agents into a dataset suitable to feed to the machine learned anomaly detection modules.

At operation 408, the security appliance may execute a supervised anomaly detection module to generate a first anomaly score in a first context. The supervised anomaly detection module may include the supervised ML model 204 of the anomaly detection module(s) 126, as shown in FIG. 2.

As discussed herein, the supervised anomaly detection module may be pre-trained using labeled data, i.e., based on ground truth. At operation 418, a computing device may prepare the labeled dataset. The computing device may be any server devices located in the cloud, e.g., the server(s) 110 shown in FIG. 1 or the endpoint device(s) 102. A set of training data may be first built based on the accumulated event data stored in the event database. A plurality of expert rules may be built as sources to label the training data. In some examples, the expert rules are generated based on known attacks and/or malicious behavior. The indicator of attack (IOA) policies, for example, may be manually implemented by human researchers to detect the intent of what an attacker is trying to accomplish, regardless of the malware or exploit used in an attack. Each IOA policy acts as a rule that describes one or more features (e.g., user ID, username, event action, event provider, source IP address, etc.). In some implementations, over 50 IOA policies that use approximate 30 features may be implemented to detect the attacks on AWS environment. In some other implementations, one hot encoding scheme may be implemented to convert categorical data variables into a format that can be readily provided to the anomaly detection modules to improve predictions. In general, the operation of the one hot encoding may transform the feature set to a larger number of unique features. In some examples, the training data may include a timestamp for each event. Based on the timestamp, the computing device may perform explorative data analysis and prepare a time series dataset using expanding windows based on cumulative sum of all events for each feature. For example, the size of the window can be set as 1 hour. The computing device may combine all the events each user performed during the window to generate the training data. At operation 420, the computing device may train the supervised anomaly detection module based on the labeled dataset. Once the performance of the supervised anomaly detection module satisfies a threshold during the validation, the supervised anomaly detection module is ready for implementation.

The first anomaly score may be the first anomaly score 302 shown in FIG. 3. As the supervised anomaly detection module is trained based on known knowledge of past attacks, the first anomaly score may indicate a probability that the real-time event contains a known type of attack.

At operation 410, the security appliance may execute a semi-supervised anomaly detection module to generate a second anomaly score in a second context.

As discussed herein, the semi-supervised anomaly detection module may be pre-trained using a combination of labeled data and unlabeled data, i.e., partially based on ground truth. At operation 422, the computing device may train the semi-supervised module based on a first set of labeled data and a second set of unlabeled data. The semi-supervised module may include one or more classifiers corresponding to one or more features, respectively. In implementations, one classifier may be trained with the first set of labeled data. The trained classifier may be used to predict a portion of the second set of unlabeled data. Out of the portion of the second set of unlabeled data, data items with high confidentiality score may be added to the first set of labeled data. The training of the classifier using the first set of labeled data may repeat until the prediction performance reaches a threshold.

The second anomaly score may be the second anomaly score 304 shown in FIG. 3. Although the semi-supervised anomaly detection module is trained partially based on past attacks, the semi-supervised anomaly detection module itself can self-learn some malicious attack patterns behind the unlabeled data. Therefore, the second anomaly prediction score may be associated with some never seen attacks (also referred to as zero-day attacks).

At operation 412, the security appliance may execute an unsupervised anomaly detection module to generate a third anomaly score in a third context.

As discussed herein, the unsupervised anomaly detection module may be pre-trained using unlabeled data. At operation 424, the computing device may train the unsupervised anomaly detection module based on unlabeled data. Unlike the supervised anomaly detection module and the semi-supervised anomaly detection module, the unsupervised anomaly detection module is trained with no ground truth basis. The computing device may implement various unsupervised learning algorithms to cluster the unlabeled dataset into different clusters. Nearest neighbor (NN) algorithm, for example, may be used to train the unsupervised anomaly detection module. Other examples may include but are not limited to, k-means clustering, principal component analysis, hierarchical clustering, deep learning, deep auto-encoding and clustering, isolation forest, etc. The unlabeled data items that exhibit similar patterns may be automatically clustered into one cluster using the NN algorithm or any other clustering algorithms with no need of human intervene. As the training of the unsupervised anomaly detection module is not based on past attacks, the unsupervised anomaly detection module may be able to discover hidden patterns in the unlabeled data and detect the new attacks that have never been seen.

In implementations, multiple anomaly classifiers may be implemented to cover all possible contexts where the security breach could happen. An alert from each anomaly classifier may be considered as a feature for a final ensemble decision. The multiple anomaly classifiers may be configured to detect anomalies across discrete domains of the cloud resources and entities such as, user identity, user behavior, privilege escalation entity access, geolocation anomalies, data exfiltration, authentication, etc.

At operation 414, the security appliance may execute a classification module to generate a final score. The classification module may be the classification decision unit 308 of the attack classification module 128, as illustrated in FIG. 3. In implementations, various ensemble algorithms may be implemented to aggregate one or more of the first anomaly prediction score from the supervised anomaly detection module, the second anomaly prediction score from the semi-supervised anomaly detection module, and the third anomaly prediction score from the unsupervised anomaly detection module and generate a final anomaly prediction score. In some examples, the classification module may utilize the anomaly prediction scores from the supervised anomaly detection module and the unsupervised anomaly detection module. In some other examples, the classification module may only utilize the anomaly prediction scores from the unsupervised anomaly detection module.

In some examples, multiple third anomaly prediction scores may be provided to the ensemble module, representing multiple features for possible anomalies detected by the unsupervised anomaly detection module. When the number of the features for possible anomalies is large, the classification module may identity the most important features from the machine learning (e.g., nearest-neighbor learning). The ensemble module may perform Chi-Square feature selection and/or principal component analysis (PCA) feature selection to reduce the number of features provided by the unsupervised anomaly detection module. The classification module may further combine the first anomaly prediction score, the second anomaly prediction score, and the reduced number of the third anomaly prediction scores to produce a final anomaly prediction score. The classification module may use voting or weighted average voting to produce the final anomaly prediction score. However, other ensemble algorithms such as bagging, boosting, adaptive boosting, stacking, etc., can also be implemented to aggregate the learning results from various anomaly detection modules.

In some examples, when the final score exceeds a preset threshold, the final prediction score may indicate a detection of an anomaly. The feature of the anomaly may be defined by one or more of the supervised anomaly detection module, the semi-supervised anomaly detection module, or the unsupervised anomaly detection module. When the final prediction score does not exceed the present threshold, the final prediction score may indicate the real-time event is a normal event.

At operation 416, the security appliance may generate an attack alert based on the final prediction score. As discussed herein, the final score may be associated with one or more contexts and indicate a probability of an anomaly in one or more domains. When the final prediction score may indicate a detection of an anomaly, based at least in part on the one or more contexts, the security applicant may generate an alert notifying the entities participating the cloud environment, e.g., the endpoint device(s) 102, the server(s) 110, the virtual machine(s) 112, the application platform(s) 114, the database(s)/storage(s) 116, etc., as illustrated in FIG. 1. The alert may automatically trigger actions on these entities to intercept the attack.

As discussed herein, the various types of anomaly detection modules are pre-trained. Once the performance of the various types of anomaly detection modules satisfies a criteria, at operation 426, the computing device may store the trained anomaly detection modules for implementation. The anomaly detection modules may be stored in the server(s) 110, the database(s)/storage(s) 116, or other devices in the network(s)/cloud(s) 104, as shown in FIG. 1. In implementations, the anomaly detection modules may be deployed the security appliance 106, as shown in FIG. 1. In other implementations, the anomaly detection modules may be deployed in other networks such as intranets of different organizations based on demand. In yet other implementations, the anomaly detection modules may be deployed in the endpoint device(s) 102, as shown in FIG. 1.

Figure 5:
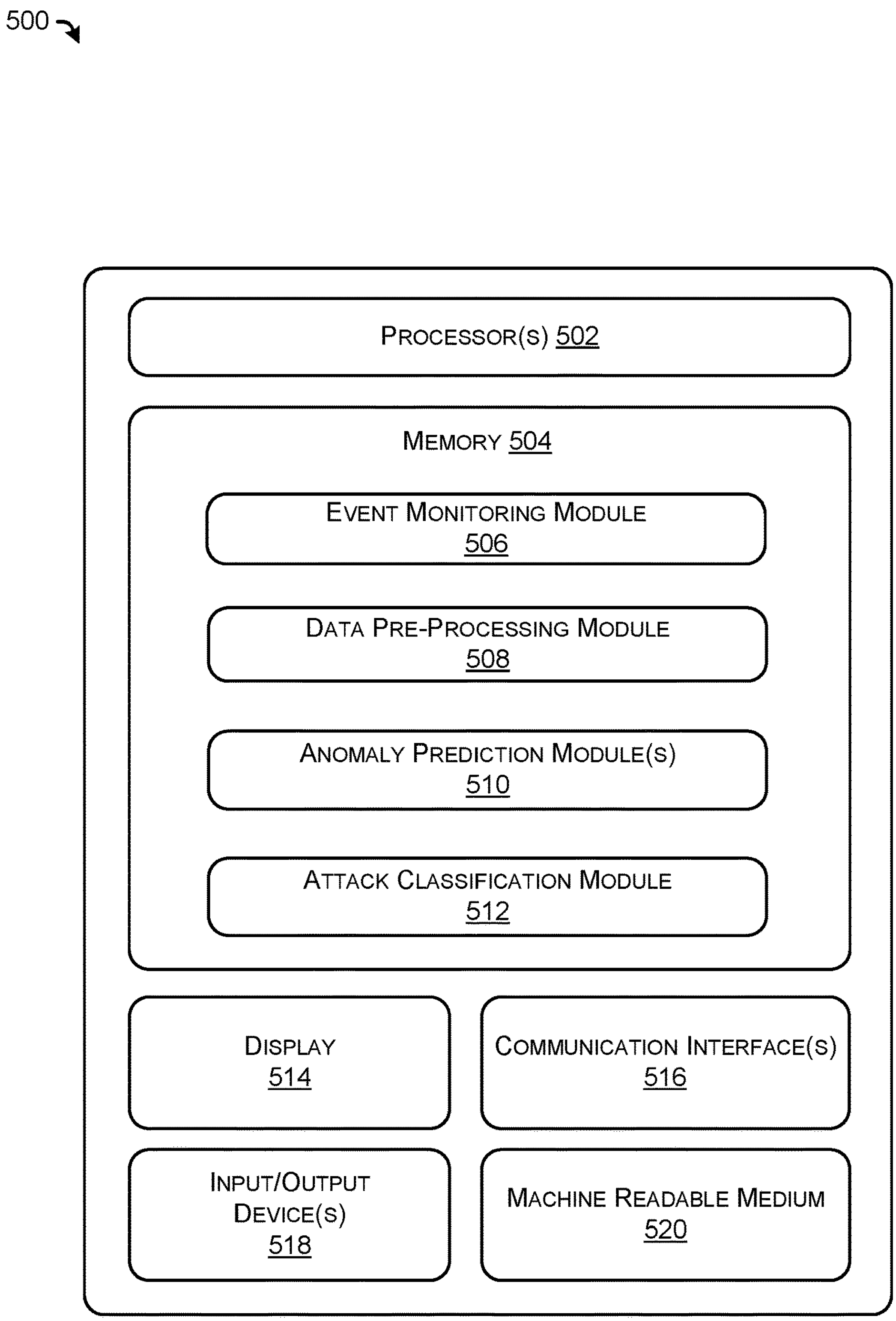
FIG. 5 illustrates an example diagram of a security appliance, in which methods for multi-cloud breach detection using ensemble classification and deep anomaly detection are implemented according to another embodiment of the present disclosure.

FIG. 5 illustrates an example diagram of a security appliance, in which methods for multi-cloud breach detection using ensemble classification and deep anomaly detection are implemented according to another embodiment of the present disclosure. The example computing device 500 may correspond to the security appliance(s) 106, as illustrated in FIG. 1. The example computing device 500 may also be any computing device on which the various anomaly detection modules can be implemented.

As illustrated in FIG. 5, a computing device 500 may comprise processor(s) 502, a memory 504 storing an event monitoring module 506, a data pre-processing module 508, anomaly prediction module(s) 510, and an attack classification module 512, a display 514, communication interface(s) 516, input/output device(s) 518, and/or a machine readable medium 520.

In various examples, the processor(s) 502 can be a central processing unit (CPU), a graphics processing unit (GPU), or both CPU and GPU, or any other type of processing unit. Each of the one or more processor(s) 502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 502 may also be responsible for executing all computer applications stored in memory 504, which can be associated with common types of volatile (RAM) and/or nonvolatile (ROM) memory.

In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 500. Any such non-transitory computer-readable media may be part of the computing device 500.

The event monitoring module 506 may be configured to monitor the network traffic or the network flow in the network(s)/cloud(s) 104. The event monitoring module 506 may track the status of the computing devices connected to the network(s)/cloud(s) 104, the types of data the computing devices are accessing, the bandwidth usage of each computing device, etc. The event monitoring module 506 may also collect the log events originated by various users and/or network entities for further analysis.

The data pre-processing module 508 may be configured to process the raw data of the logged events so that the dataset is suitable to feed the various anomaly detection modules. The data pre-processing module 508 may perform one or more operations such as data cleaning, data transformation, dimension reduction, filling missing values, etc.

The anomaly prediction module(s) 510 may be configured to detect the anomalies using one or more machine learning modules. In some examples, the machine learning module may be trained using labeled data based on known knowledge on the past attacks (e.g., supervised machine learning). In some other examples, the machine learning module may be trained using unlabeled data with no knowledge of the past attacks (e.g., unsupervised machine learning). In yet other examples, the machine learning module may be trained using a combination of labeled data and unlabeled data (e.g., semi-supervised machine learning). Hidden pattern or context in the unlabeled data may be discovered during learning and at least a portion of the unlabeled data can be labeled based on the learning. The anomaly prediction module(s) 510 may produce various anomaly prediction scores along with feature representations associated therewith.

The attack classification module 512 may be configured to aggregate the various anomaly prediction scores and generate a final anomaly prediction score. The attack classification module 512 may use different combination of the results from the various anomaly detection modules. In some examples, the attack classification module 512 may combine all the results from the supervised anomaly detection module, the semi-supervised anomaly module, and the unsupervised anomaly module. In other examples, the attack classification module 512 may combine the results from the supervised anomaly detection module and the unsupervised anomaly module. In yet other examples, the attack classification module 512 may solely relies on the prediction scores from the semi-supervised anomaly module or the unsupervised anomaly module. In some examples, when the results from the unsupervised anomaly detection module have a large number of feature representations, the attack classification module 512 may perform feature selections to select the most important features for further analysis. The attack classification module 512 may utilize any ensemble algorithms/models to produce the final anomaly prediction score.

Display 514 can be a liquid crystal display or any other type of display commonly used in the computing device 500. For example, display 514 may be a touch-sensitive display screen and can then also act as an input device or keypad, such as for providing a soft-key keyboard, navigation buttons, or any other type of input. Input/output device(s) 518 can include any sort of output devices known in the art, such as display 514, speakers, a vibrating mechanism, and/or a tactile feedback mechanism. Input/output device(s) 518 can also include ports for one or more peripheral devices, such as headphones, peripheral speakers, and/or a peripheral display. Input/output device(s) 518 can include any sort of input devices known in the art. For example, input/output device(s) 518 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The communication interface(s) 516 can include transceivers, modems, interfaces, antennas, and/or other components that perform or assist in exchanging radio frequency (RF) communications with base stations of the telecommunication network, a Wi-Fi access point, and/or otherwise implement connections with one or more networks.

The machine readable medium 520 can store one or more sets of instructions, such as software or firmware, that embodies any one or more of the methodologies or functions described herein. The instructions can also reside, completely or at least partially, within the memory 504, processor(s) 502, and/or communication interface(s) 516 during execution thereof by the computing device 500. The memory 504 and the processor(s) 502 also can constitute machine readable media 520.

The various techniques described herein may be implemented in the context of computer-executable instructions or software, such as program components, that are stored in computer-readable storage and executed by the processor(s) of one or more computing devices such as those illustrated in the figures. Generally, program components include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer-implemented method, the method comprising:

receiving real-time event data indicative of a user behavior on a cloud;

determining, based at least in part on inputting the real-time event data to a trained supervised machine learning (ML) model, a first anomaly score corresponding to a first anomaly and a first context associated with the first anomaly;

determining, based at least in part on inputting the real-time event data to a trained unsupervised ML model, one or more second anomaly scores corresponding to one or more second anomalies and one or more second contexts associated with the one or more second anomalies, respectively, wherein the trained unsupervised ML model includes a plurality of anomaly classifiers, and inputting the real-time event data to the trained unsupervised ML model triggers the plurality of anomaly classifiers to output the one or more second anomaly scores and the one or more second contexts to indicate one or more domains that the one or more second anomaly scores are associated with;

determining, based at least in part on inputting the real-time event data to a third trained ML model, a third anomaly score corresponding to a third anomaly, and a third context associated with the third anomaly;

determining, based at least in part on inputting the first anomaly score, the first context, the one or more second anomaly scores, the one or more second contexts, the third anomaly score, and the third context to a classification module, a final score corresponding to a final anomaly and a final context associated with the final anomaly;

determining, based on the final score being equal to or greater than a threshold, that the final anomaly is a malicious attack; and based on determining that the final anomaly is the malicious attack, transmitting an alert to network entities connected to the cloud, wherein the alert automatically triggers the network entities to intercept the malicious attack.

2. The method of claim 1, wherein the supervised ML model is trained to detect an anomaly in the first context, and the supervised ML model is trained by performing actions including:

obtaining, based on historical events stored in a database, a set of training data;

determining, based at least in part on known anomaly behaviors, a plurality of first features corresponding to the known anomaly behaviors in the first context;

labeling, based at least in part on the plurality of first features, the set of training data to obtain labeled training data; and training a supervised ML model using the labeled training data to obtain the supervised trained ML model.

3. The method of claim 2, wherein the set of training data includes timestamps associated with the historical events, respectively, and the actions further include:

obtaining, based on the timestamps, the historical events in a time period;

aggregating the historical events in the time period to obtain aggregated historical events; and obtaining, based on the aggregated historical events, the set of training data.

4. The method of claim 1, wherein the unsupervised ML model is trained to detect an anomaly in at least one second context, and the unsupervised ML model is trained by performing actions including:

obtaining, based on historical events stored in a database, a set of training data;

clustering the set of training data to obtain a plurality of clustered data sets; and training an unsupervised ML model using the plurality of clustered data sets to obtain the unsupervised trained ML model.

5. The method of claim 1, wherein the third trained ML model includes a semi-supervised ML model trained to detect an anomaly in the third context, and the semi-supervised ML model is trained by performing actions including:

obtaining, based on historical events stored in a database, a first set of labeled training data annotated based on known anomaly behaviors in the third context;

obtaining, based on historical events stored in the database, a second set of unlabeled training data; and training a third ML model using the first set of labeled training data and second set of unlabeled training data to obtain the third trained ML model.

6. The method of claim 1, wherein determining, based at least in part on inputting the first anomaly score, the first context, the one or more second anomaly scores, the one or more second contexts, the third anomaly score, and the third context to the classification module, the final score, further comprises:

determining, based at least in part on the first score, the one or more second scores, and the third score, and using a classification algorithm, the final score, wherein the classification algorithm includes at least one of a bagging algorithm, a boosting algorithm, a voting algorithm, or a weighted majority voting algorithm.

7. The method of claim 1, further comprising:

determining, based at least in part on the one or more second contexts indicative of the one or more domains that the one or more second anomaly scores are associated with, that the final anomaly is a new attack; and providing the final context to a security agency to take actions to address the new attack.

8. The method of claim 1, wherein the first context and the one or more second contexts represent discrete domains including at least one of user identity, user behavior, privilege escalation entity access, geolocation anomalies, data exfiltration, or authentication.

9. A computing device comprising:

a processor, and a memory storing instructions executed by the processor to perform actions including:

receiving real-time event data indicative of a user behavior on a cloud;

determining, based at least in part on inputting the real-time event data to a trained supervised machine learning (ML) model, a first anomaly score corresponding to a first anomaly and a first context associated with the first anomaly;

determining, based at least in part on inputting the real-time event data to a trained unsupervised ML model, one or more second anomaly scores corresponding to one or more second anomalies and one or more second contexts associated with the one or more second anomalies, respectively, wherein the trained unsupervised ML model includes a plurality of anomaly classifiers, and inputting the real-time event data to the trained unsupervised ML model triggers the plurality of anomaly classifiers to output the one or more second anomaly scores and the one or more second contexts to indicate one or more domains that the one or more second anomaly scores are associated with;

determining, based at least in part on inputting the real-time event data to a third trained ML model, a third anomaly score corresponding to a third anomaly and a third context associated with the third anomaly;

determining, based at least in part on inputting the first anomaly score, the first context, the one or more second anomaly scores, the one or more second contexts, the third anomaly score, and the third context to an attack classification module, a final score corresponding to a final anomaly and a final context associated with the final anomaly;

determining, based on the final score being equal to or greater than a threshold, that the final anomaly is a malicious attack; and based on determining that the final anomaly is the malicious attack, transmitting an alert to network entities connected to the cloud, wherein the alert automatically triggers the network entities to intercept the malicious attack.

10. The computing device of claim 9, supervised ML model is trained to detect an anomaly in the first context, and the supervised ML model is trained by performing the actions including:

obtaining, based on historical events stored in a database, a set of training data;

determining, based at least in part on known anomaly behaviors, a plurality of first features corresponding to the known anomaly behaviors in the first context;

labeling, based at least in part on the plurality of first features, the set of training data to obtain labeled training data; and training a supervised ML model using the labeled training data to obtain the supervised trained ML model.

11. The computing device of claim 10, wherein the set of training data includes timestamps associated with the historical events, respectively, and the actions further include:

obtaining, based on the timestamps, the historical events in a time period;

aggregating the historical events in the time period to obtain aggregated historical events; and obtaining, based on the aggregated historical events, the set of training data.

12. The computing device of claim 9, wherein the unsupervised ML model is trained to detect an anomaly in at least one second context, and the unsupervised ML model is trained by performing the actions including:

obtaining, based on historical events stored in a database, a set of training data;

clustering the set of training data to obtain a plurality of clustered data sets; and training an unsupervised ML model using the plurality of clustered data sets to obtain the unsupervised trained ML model.

13. The computing device of claim 12, wherein determining, based at least in part on inputting the first anomaly score, the first context, the one or more second anomaly scores, the one or more second contexts, the third anomaly score, and the third context to the attack classification module, the final score, further comprises:

determining, based at least in part on the first anomaly score, the one or more second anomaly scores, and the third anomaly score, and using a classification algorithm, the final score, wherein the classification algorithm includes at least one of a bagging algorithm, a boosting algorithm, a voting algorithm, or a weighted majority voting algorithm.

14. The computing device of claim 9, wherein the actions further include:

determining, based at least in part on the one or more second contexts indicative of the one or more domains that the one or more second anomaly scores are associated with, that the final anomaly is a new attack; and providing the final context to a security agency to take actions to address the new attack, wherein the first context, the one or more second contexts, and the final context represent discrete domains including at least one of user identity, user behavior, privilege escalation entity access, geolocation anomalies, data exfiltration, or authentication.

15. A non-transitory computer-readable storage medium storing computer-readable instructions, that when executed by a processor, cause the processor to perform actions comprising:

receiving real-time event data indicative of a user behavior on a cloud;

determining, based at least in part on inputting the real-time event data to a supervised machine learning (ML) model, a first anomaly score corresponding to a first anomaly and a first context associated with the first anomaly;

determining, based at least in part on inputting the real-time event data to un unsupervised ML model, one or more second anomaly scores corresponding to one or more second anomalies and one or more second contexts associated with the one or more second anomalies, respectively, wherein the unsupervised ML model includes a plurality of anomaly classifiers, and inputting the real-time event data to the unsupervised ML model triggers the plurality of anomaly classifiers to output the one or more second anomaly scores and the one or more second contexts to indicate one or more domains that the one or more second anomaly scores are associated with;

determining, based at least in part on inputting the real-time event data to a semi-supervised ML model, a third anomaly score corresponding to a third anomaly and a third context associated with the third anomaly;

determining, based at least in part on inputting the first anomaly score, the first context, the one or more second anomaly scores, the one or more second contexts, the third anomaly score, and the third context to a classification module, a final score corresponding to a final anomaly and a final context associated with the final anomaly; and determining, based on the final score being equal to or greater than a threshold, that the final anomaly is a malicious attack; and based on determining that the final anomaly is the malicious attack, transmitting an alert to network entities connected to the cloud, wherein the alert automatically triggers the network entities to intercept the malicious attack.

16. The non-transitory computer-readable storage medium of claim 15, wherein the supervised ML model is trained to detect an anomaly in the first context, and the supervised ML model is trained by performing the actions including:

obtaining, based on historical events stored in a database, a set of training data;

determining, based at least in part on known anomaly behaviors, a plurality of first features corresponding to the known anomaly behaviors in the first context;

labeling, based at least in part on the plurality of first features, the set of training data to obtain labeled training data; and training a supervised ML model using the labeled training data to obtain the supervised trained ML model.

17. The non-transitory computer-readable storage medium of claim 16, wherein the set of training data includes timestamps associated with the historical events, respectively, and the actions further include:

obtaining, based on the timestamps, the historical events in a time period;

aggregating the historical events in the time period to obtain aggregated historical events; and obtaining, based on the aggregated historical events, the set of training data.

18. The non-transitory computer-readable storage medium of claim 15, wherein the actions further include:

determining, based at least in part on the one or more second contexts indicative of the one or more domains that the one or more second anomaly scores are associated with, that the final anomaly is a new attack; and providing the final context to a security agency to take actions to address the new attack, wherein the first context, the one or more second contexts and the final context represent discrete domains including at least one of user identity, user behavior, privilege escalation entity access, geolocation anomalies, data exfiltration, or authentication.

* * * * *